Figure 1:
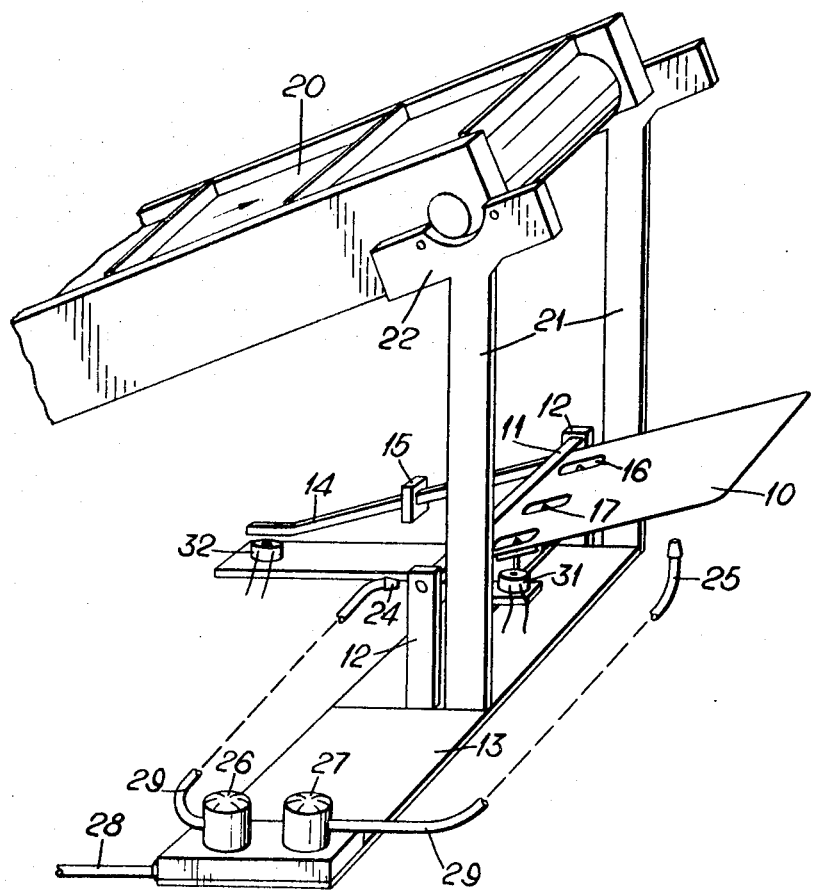

United States Patent
Westwood et al.

[15] 3,642,128
[45] Feb. 15, 1972

[54] APPARATUS USING AIR JETS FOR SORTING BY WEIGHT

[72] Inventors: Alan S. Westwood; Donald Carmichael, both of Corby, England

[73] Assignee: Golden Wonder Limited, Corby, England

[22] Filed: June 5, 1970

[21] Appl. No.: 43,710

[30] Foreign Application Priority Data

July 25, 1969 Great Britain......................37,387/69

[52] U.S. Cl..............................................209/121, 177/50
[51] Int. Cl......................................B07c 5/20, G01g 13/22
[58] Field of Search...........................177/1, 50, 60; 209/121

[56] References Cited

UNITED STATES PATENTS

| | | |
|---|---|---|
| 2,235,725 | 3/1941 | Nordquist..............................209/121 |
| 2,488,037 | 11/1949 | Rupley....................................209/121 |
| 3,369,661 | 2/1968 | Bradshaw..........................209/121 X |

Primary Examiner—Robert S. Ward, Jr.
Attorney—Larson, Taylor and Hinds

[57] ABSTRACT

An inexpensive rapid-response check weigher for separate removal of underweight/overweight packets which may contain potato crisps for example. The packets are of light weight and after weighing are removed by air jets in one of two directions depending on their weight. The apparatus is designed for cooperation with a conveyor which feeds it with a series of packets one by one in rapid succession.

7 Claims, 3 Drawing Figures

APPARATUS USING AIR JETS FOR SORTING BY WEIGHT

This invention relates to weighing apparatus and more particularly to apparatus for check weighing a series of articles fed singly in rapid succession to it. The articles are sufficiently light to be capable of being moved by a jet of compressed air.

Certain snack foods, e.g., potato crisps, popcorn and small expanded biscuits are loaded into packets on mass production lines but because of the shape and fragility of the foods it is difficult to pack them tightly and ensure that each packet receives precisely the correct weight of food. Consequently some packets may be considerably underweight and it is important to detect and quickly isolate them from the packets of acceptable weight.

One object of this invention is to provide check weighing apparatus which, although relatively inexpensive compared to known precision apparatus, is able to detect and quickly isolate from a series of articles fed singly to it those articles which are of considerable underweight. Alternatively, the apparatus may be arranged to detect and quickly isolate articles of considerable overweight. In either case speed of operation is essential.

The term "weigh pan" is used in this specification to denote a member which receives the articles to be weighed one by one. It can take any suitable form, but is preferably a flat smooth plate.

According to the invention, there is provided apparatus for check weighing a series of articles one by one and comprising a weigh pan mounted to pivot downwards when an article is deposited on it and an air jet system for removal of an article from the weigh pan in one of two directions depending on the degree of downward tilt of the weigh pan, characterized in that the operation of the air jet system is controlled by means responsive to the degree of downward tilt of the weigh pan.

Preferably, the weigh pan is provided with a counterbalancing beam and the apparatus is characterized in that the means for controlling the operation of the air jet system are switch means operable by pivotal movement of the weigh pan/balancing beam assembly.

The air jet system may comprise two air nozzles, one being arranged to blow an article from the weigh pan in one direction, the other being arranged to direct an air jet against the underside of the weigh pan to return the weigh pan upwards, causing an article thereon to slide off the weigh pan in a different direction to the said one direction.

Figure 2:
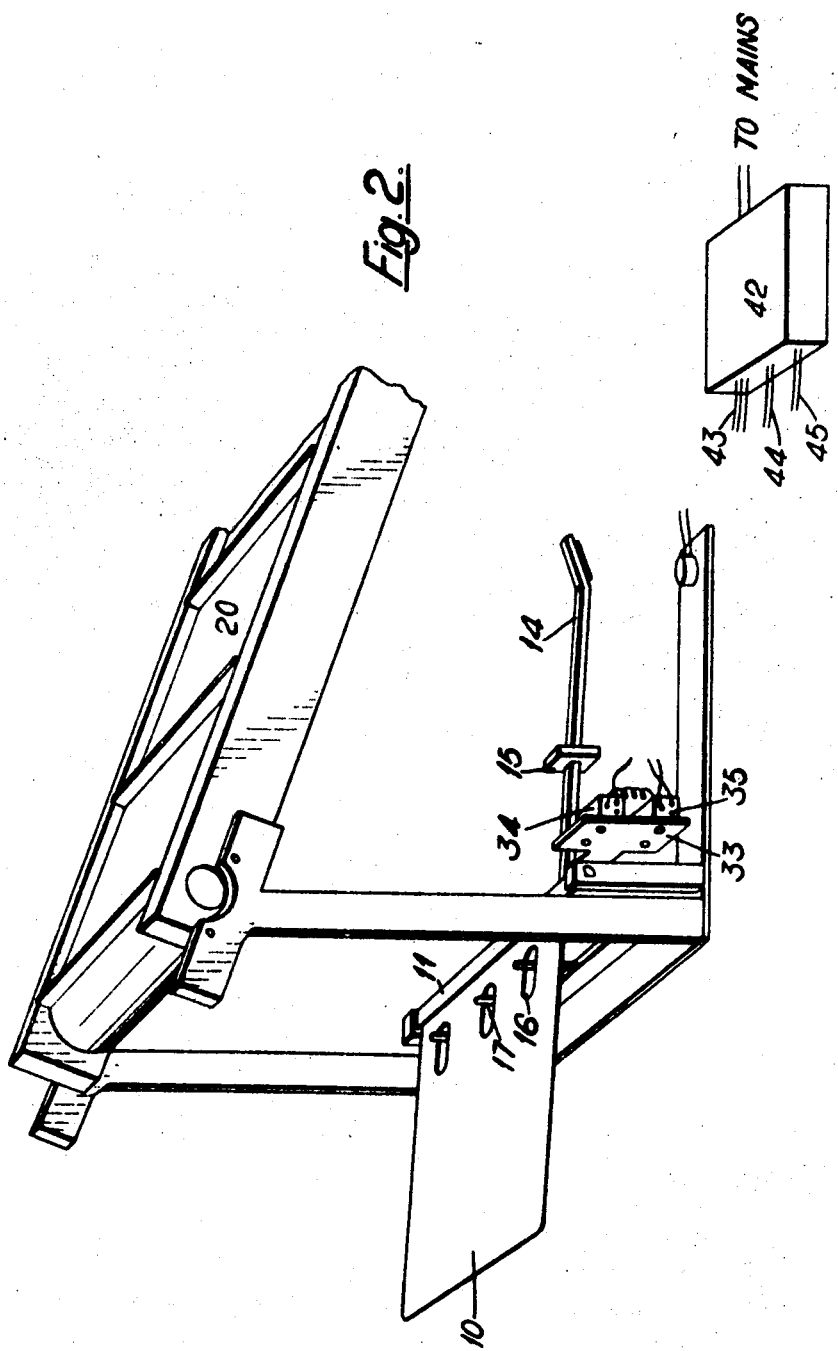
Figure 3:
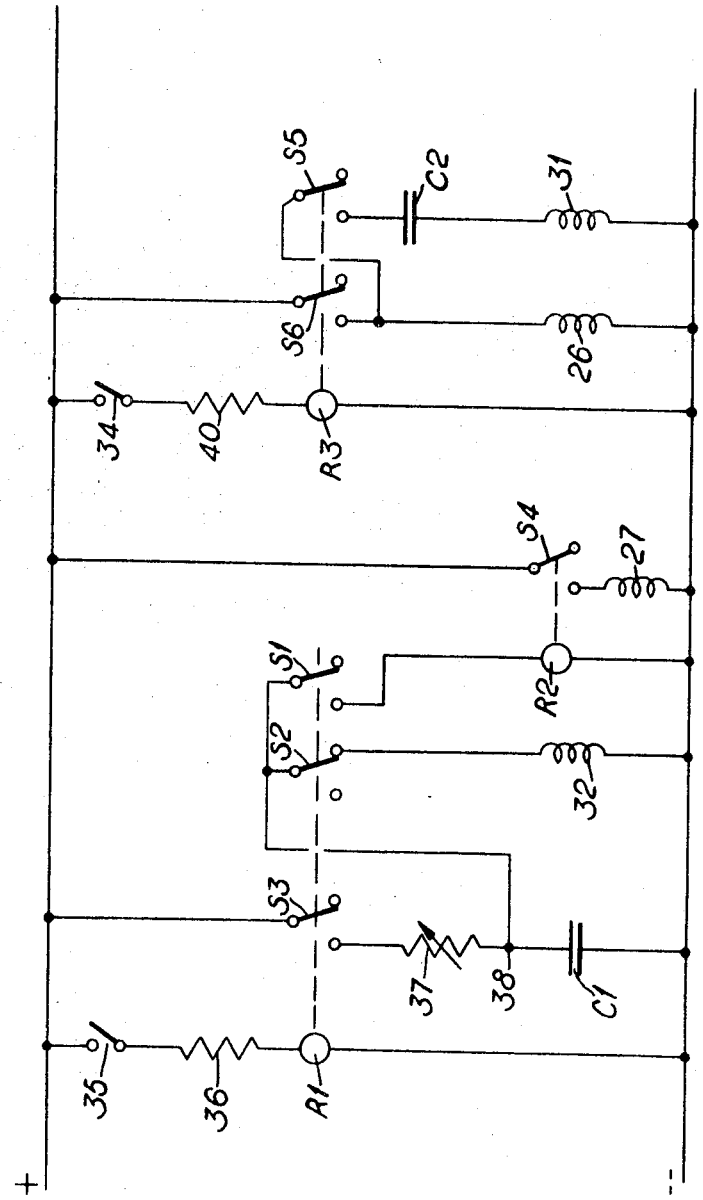

By way of example the invention will now be described with reference to the accompanying drawings of which:

FIG. 1 is a perspective view from one side of a check weighing apparatus showing a pivotable weigh pan tilted upwards ready to receive an article, FIG. 2 is a perspective view from the opposite side showing the weigh pan with a reduced upward tilt, and FIG. 3 is a diagram of an electrical system for controlling the operation of the apparatus.

The check weighing apparatus illustrated is designed to detect underweight articles and quickly transfer them to a separate container behind the weigh pan.

Referring mainly to FIGS. 1 and 2, the apparatus comprises a weigh pan 10 for receiving the articles one by one which is rigidly secured to the front of a horizontal crossbeam 11 with cylindrical ends which are pivotally mounted in two pillars 12 standing on a base 13. A beam 14 which is rigidly secured to the rear of the crossbeam 11 mounts an adjustable counterbalance weight 15 which can be slid along the beam 14 and locked in a selected position. The base of the weigh pan is provided near its pivot axis with a number of parallel slots 16 which register below with a like number of fixed vertical pins 17 supported from a crossmember below the weigh pan. The base is suspended from the framework of an inclined endless conveyor 20 by means of a pair of vertical struts 21 provided with headpieces 22 which are detachably secured to the conveyor framework. The conveyor is arranged to feed a rapid succession of light articles, e.g., packets of potato crisps, one by one to the weigh pan 10, each packet dropping in turn on to the weigh pan from the upper end of the conveyor.

An air jet system for removal of each packet after it has been check weighed comprises an air nozzle 24 behind the weigh pan which faces forwards, an air nozzle 25 below the weigh pan which faces upwards, and a pair of solenoid valves 26, 27 for controlling a supply of compressed air from a supply pipe 28 to their respective associated nozzles 24, 25 via feed pipes 29. When discharging, the nozzle 24 directs an air jet against a packet on the weigh pan to blow it forwards off the weigh pan, whereas the nozzle 25 when discharging directs an air jet against the underside of the weigh pan causing it to tilt upwards and the packet thereon to slide rearwards off the weigh pan. Separate containers (not shown) are located below the weigh pan, one in front and one behind it to receive their appropriate weighed packets.

The apparatus is provided with an electrical system for controlling the air jet system in accordance with the degree of tilt of the weigh pan when it receives a packet. The electrical system also controls the damping of the weigh pan/counterbalancing beam assembly 10, 14 motion during its return movement after a packet has been removed from it.

Two electromagnetic vibration damping devices are provided for the weigh pan/counterbalancing beam assembly, the coils of the respective devices being indicated by the reference numerals 31, 32.

A support plate 33 mounts top and bottom microswitch units 34, 35 and also a pair of spring blades (not shown) which are arranged to engage the beam 14 and move with it to operate the switch units 34, 35.

Referring more particularly to FIG. 3, which shows the electrical system deenergized, the left-hand portion comprises the switch unit 35 connected via a resistor 36 to a relay R1 which controls switches S1, S2, S3, a variable resistor 37, a tapping 38, a capacitor C1, the damping coil 32, a second relay R2 which controls a switch S4, and the solenoid valve 27. This portion of the electrical system is used to operate the front air nozzle 25 in the case of an underweight packet.

The right-hand portion of the electrical system comprises the switch unit 34 connected via a resistor 40 to a third relay R3 which controls switches S5, S6, the solenoid valve 26, a capacitor C2 and the damping coil 31. This portion of the electrical system is used to operate the rear air nozzle 24 in the case of a packet of acceptable weight.

Conveniently the three relays, the three resistors and the two capacitors are housed in a box 42 alongside the apparatus, (see FIG. 2) the three leads 43 being connected to the microswitch units 34, 35, the leads 44 being connected to the rear damper coil 32, and the leads 45 being connected to the front damper coil 31.

In use, the weigh pan 10 can assume the following significant positions, viz a READY position of maximum upward tilt when empty and responsive to the counterbalancing weight 15, a REJECT intermediate position of reduced upward tilt which it assumes when supporting a packet of considerable underweight, and an ACCEPT position of further reduced upward tilt which it assumes when supporting a packet of acceptable weight. Thus the weigh pan has at all times an upward tilt above the horizontal which promotes speed of operation.

The apparatus may be set and operated in the following manner. Firstly the apparatus is secured in position below the discharge point of the conveyor 20 as shown. Then the position of the weight 15 along the beam 14 is adjusted to suit the estimated momentum of the packets which are to drop on to the weigh pan 10. If this adjustment is insufficient, the weight 15 can be replaced or reinforced by another weight. The accuracy of the apparatus is improved if the packets fall in an attitude which is parallel and not edge-on to the tilted weigh pan; accordingly it is preferred to provide guide or deflection means which ensure that the packets fall parallel to the weigh pan.

The conveyor is started to feed the packets to the weigh pan 10. The first packet drops on to the weigh pan which is at its READY position (FIG. 1) and the weigh pan tilts downwards under the momentum of the packet. The resulting initial upward movement of the beam 14 and thus also the spring blades closes the bottom switch unit 35, and the relay R1 is energized to close its associated switches S1–S3. However there is a brief delay, say 0.5 seconds, imposed by the adjustable resistor 37 and capacitor C1 before the relay R2 becomes energized.

If the packet on the weigh pan is of acceptable weight, i.e., is not underweight, the weigh pan reaches the ACCEPT position so that the movement of the beam 14 and the spring blades also closes the top switch unit 34, energizing the relay R3 to close its associated switches S5, S6. As a result the solenoid valve 26 is operated to allow a jet of compressed air to issue from the rear nozzle 24 and blow the packet forwards off the weigh pan and into the front container for acceptable packets. In addition, the damper coil 31 is energized for, say, 0.2 second by a discharge from the capacitor C2 in order to exert a damping effect on the upward return movement of the now empty weigh pan under the influence of the weight 15. Finally, the damper coil 32 is energized for say, 0.2 seconds by a discharge from the capacitor C1 in order to exert a damping effect on the downward return movement of the beam 14. Thus the combined effect of both damping devices is to minimize oscillation or vibration of the weigh pan/counterbalancing beam assembly 10, 14 so that the weigh pan becomes stationary at its READY position to receive the next packet with a minimum of delay.

During the last phase of the downward tilt of the weigh pan under the momentum of the first packet, the fixed pins 17 project through the slots 16 as seen in FIG. 2 so as to provide abutment stops which prevent any possible loss of the packet backwards over the crossbeam 11 before the air nozzle 24 can become effective.

Let us assume that the second packet which drops on to the weigh pan 10 is underweight. The weigh pan tilts downwards, the bottom switch unit 35 is closed, the relay R1 is energized to close its associated switches S1–S3, and the adjustable resistor 37 operates as before. However, the weigh pan tilts downwards in this case only as far as its REJECT position and so the top switch unit 34 remains open. The capacitor C1 starts to charge and when the voltage at tapping 38 reaches a predetermined level after approximately 0.5 second, due to the resistor and capacitor, the relay R2 becomes energized and closes its associated switch S4. Thereupon the solenoid valve 27 is operated to allow a jet of compressed air to issue from the front nozzle 25 and blow against the undersurface of the weigh pan causing it to return upwards so that the packet slides backwards over the crossbeam 11 into the rear container for rejected packets. Because the weigh pan is tilted downwards only as far as the intermediate REJECT position, the pins 17 do not project through the slots 16 and so do not impede the backward ejection of the packet. The jet-assisted return movement of the weigh pan results in opening of the bottom switch unit 35, the relay R1 becomes deenergized and it allows the now charged capacitor C1 to discharge and temporarily energize the damping coil 32 for say 0.2 second to dampen oscillation of the weigh pan - counterbalancing beam assembly. This discharge also ensures that the capacitor C1 in the delay circuit is fully discharged before the next cycle of operation begins. IN this manner the air jet system is always controlled by switch means which are responsive to the degree of downward tilt of the weigh pan, thereby enabling the apparatus to operate sufficiently quickly for use with a rapid conveyor feed. For example, the correct weight of a packet of potato crisps may be 15 drams. The apparatus described is able to handle a feed rate of one packet every 2.5 seconds and to reject packets of 12 drams or less weight. It can also reject nearly all packets of 13 or 14 drams.

Instead of using microswitch units with spring blades for closing the electrical circuit and for sensing an acceptable weight respectively, there may be substituted photocells or proximity switches to carry out the same functions. These alternative devices have the advantage that they do not require a mechanical connection with the balancing assembly.

In a modification of the air jet system, the rear nozzle 24 is incorporated in one or more of the stop pins 17 which are made hollow for the purpose.

One way of converting the apparatus into one for detecting articles which are overweight is simply to reverse the output containers so that the acceptable articles, i.e., the lighter articles, are discharged rearwards upon operation of the nozzle 25 whereas the overweight articles are blown forwards by the operation of the nozzle 24.

We claim:

1. Apparatus for check weighing a series of articles one by one and comprising a weigh pan mounted to pivot downwards when an article is deposited on it and an air jet system for removal of an article from the weigh pan in one of two directions depending on the degree of downward tilt of the weigh pan, characterized in that the operation of the air jet system is controlled by means responsive to the degree of downward tilt of the weigh pan and in that said air jet system comprises two air nozzles, one being arranged to blow an article from the weigh pan in one direction, the other being arranged to direct an air jet against the underside of the weigh pan to return the weigh pan upwards, causing an article thereon to slide off the weigh pan in a different direction to the said one direction.

2. Apparatus according to claim 1 and wherein the weigh pan is provided with a counterbalancing beam, characterized in that the means for controlling the operation of the air jet system are switch means operable by pivotal movement of the weigh pan/balancing beam assembly.

3. Apparatus according to claim 1, characterized in that the weigh pan has always an upward tilt above the horizontal.

4. Apparatus according to claim 1, characterized in that damping means are provided for damping the return movement of the empty weigh pan.

5. Apparatus according to claim 4 and wherein the weigh pan is provided with a counterbalancing beam, characterized in that a first damping device is arranged to act on the weigh pan and a second damping device is arranged to act on the beam.

6. Apparatus according to claim 3, characterized in that openings are provided in the base of the weigh pan adjacent the pivot axis of the weigh pan and in that fixed vertical pins are located below the openings, which pins are arranged to project upwards through their respective openings to provide abutment stops for an article whenever the weigh pan tilts downwards under an article of acceptable weight.

7. Apparatus according to claim 6, characterized in that an air nozzle forming part of the air jet system is arranged to discharge a jet of air across the pivot axis of the weigh pan to blow an article of acceptable weight thereon away from the pins and off the weigh pan.

\* \* \* \* \*